United States Patent [19]
Doucet

[11] Patent Number: 5,249,268
[45] Date of Patent: Sep. 28, 1993

[54] PROCESS FOR TRANSMITTING DATA BETWEEN ENTITIES CAPABLE OF EMITTING AND/OR RECEIVING DATA

[75] Inventor: René Doucet, Le Touvet, France
[73] Assignee: Telemecanique, France
[21] Appl. No.: 477,851
[22] PCT Filed: May 18, 1989
[86] PCT No.: PCT/FR89/00237
§ 371 Date: Jan. 18, 1990
§ 102(e) Date: Jan. 18, 1990
[87] PCT Pub. No.: WO89/11698
PCT Pub. Date: Nov. 30, 1989

[30] Foreign Application Priority Data
May 18, 1988 [FR] France ............................ 88 06966

[51] Int. Cl.⁵ .................. H04L 9/00; G06F 13/14
[52] U.S. Cl. .................. 395/200; 364/940.81; 364/940.62; 364/940.8; 364/974.7; 364/DIG. 2
[58] Field of Search ............ 364/200, 900, 940.81, 364/940.62, 940.8, 974.7; 395/200

[56] References Cited
U.S. PATENT DOCUMENTS
4,393,269 7/1983 Konheim et al. ............... 178/22.08

Primary Examiner—Gareth D. Shaw
Assistant Examiner—A. Katbab
Attorney, Agent, or Firm—William A. Drucker

[57] ABSTRACT

The process disclosed is appliable to transmission of data of the multiplexed series type between entities capable of emitting or receiving data, to or from the line. Each entity connected to the line can access all the data flowing in the line, and all the exchanged data are modeled by a distributed data base which is updated and maintianed by the fact that each entity stores and updates a local copy of the corresponding useful part of the data base it contains. Each time an entity is placed in service, a coherence check is carried out to ensure that the emitting and consuming entities interpret data in the same way. The coherence check is carried out by a protocol without prior contact or acknowledgement.

7 Claims, 3 Drawing Sheets

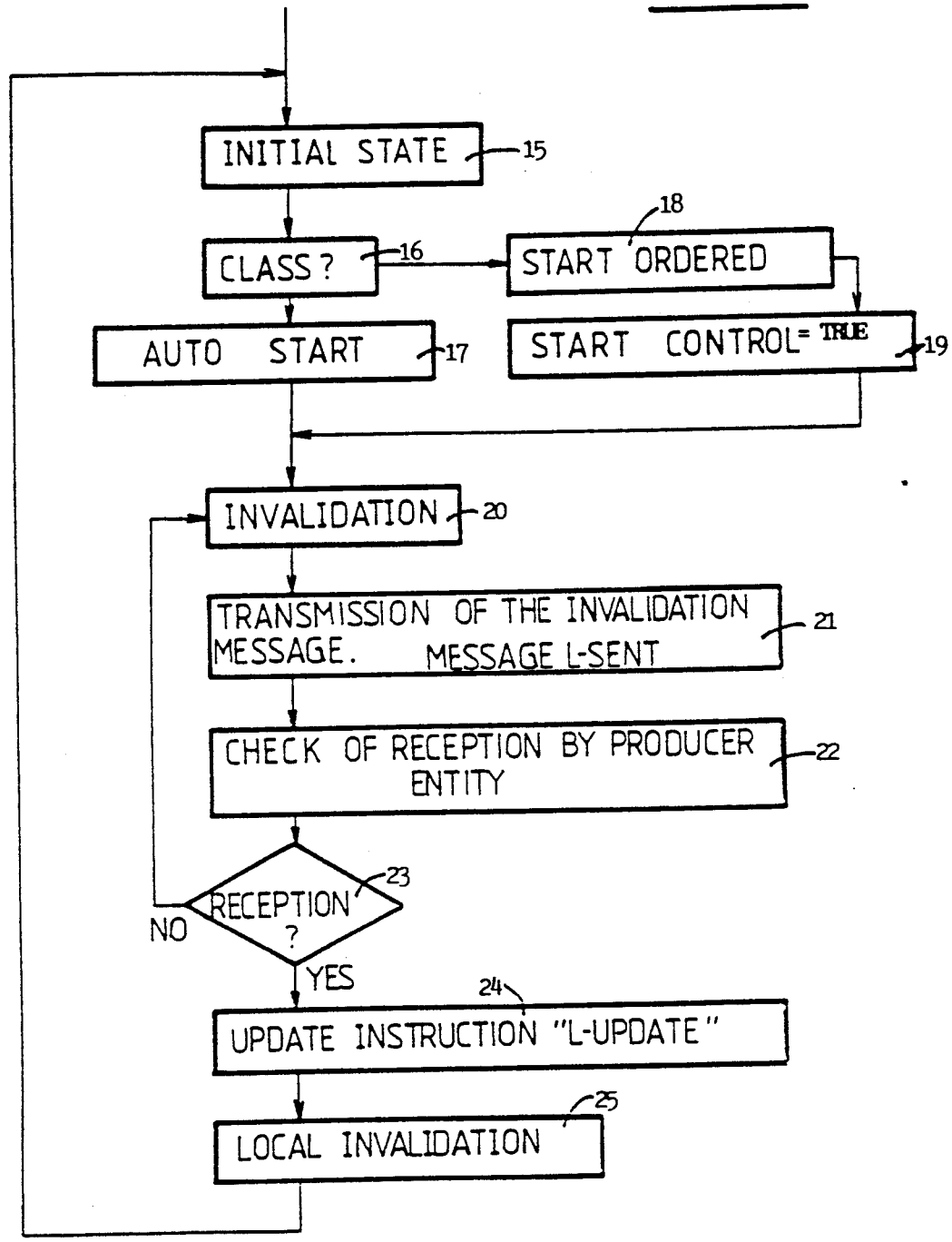

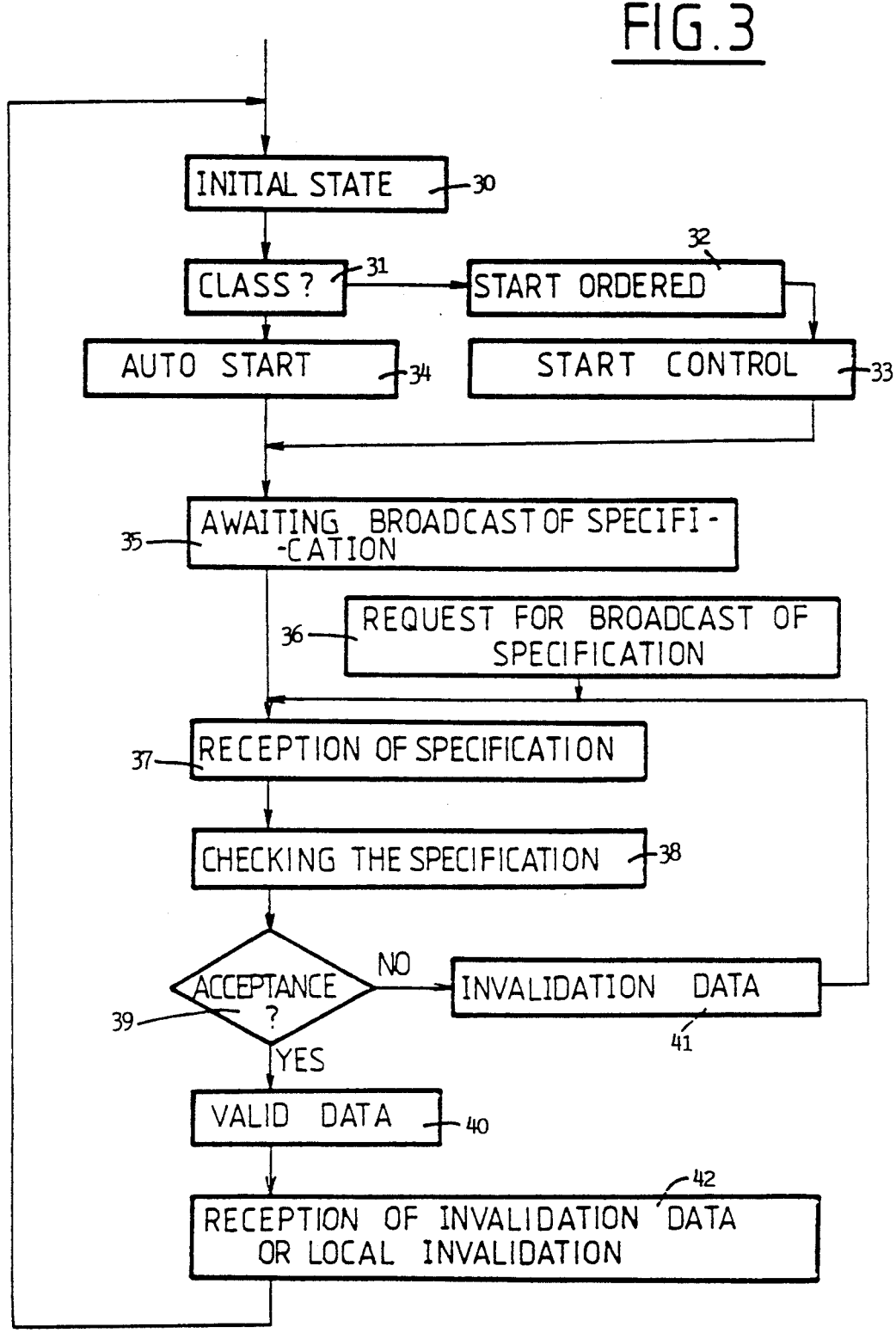

PROCESS FOR TRANSMITTING DATA BETWEEN ENTITIES CAPABLE OF EMITTING AND/OR RECEIVING DATA

FIELD OF THE INVENTION

The present invention relates to a transmission method of the multiplexed series type which can be used for exchanging information between the sensors, the actuators and programmable automata of a procedure.

BACKGROUND OF THE INVENTION

Generally, communication between the sensors, actuators and programmable automata is provided wire to wire, which represents considerable wiring costs without a real service quality.

The invention relates more particularly to a better adapted communications system which reduces the wiring costs and which permits the connection of all industrial equipment included in a control and checking system and complying with an appropriate standard.

Its objective is to design systems with evolutive modular structures from a limited range of material modules making mass production possible so as to reduce the costs.

This evolutive modular structure must make it possible to respond to a wide range of applications, by software personalization.

SUMMARY OF THE INVENTION

In such a system, the invention proposes a protocol for exchanging information between data processing equipment of programmable automaton or industrial computer type, instrumentation equipment of more or less intelligent sensor or actuator type and operator interfaces of individual actuator signalling and control type.

This protocol must be sufficiently general to allow equipment which may be of different origins to be readily interconnected so as to form an industrial checking and control system without any problem of conviviality between these different pieces of equipment.

The information exchanges take place by means of a line capable of effecting transmission, without acquittal of the multiplexed series type (for example coaxial cable, optical fibres), between components of the system (entities) for receiving or transmitting information from or to the communication carrier and to ensure physical and logic interfaces between the line tools and the application interfaces, line tools providing matching of the signals between the components of the system and the line, and a Bus Arbitrator.

The application interfaces may be of different types and may, for example, consist of:
  reception equipment (logic, analog outputs, interface displays of data acquisition, specialized equipment, . . .);
  transmission equipment which transmits data over the line when requested to do so, such data consisting of sensor logic or analog acquisitions, controls from programmable automatic devices, interautomata data exchanges, specialized data required for the application;
  reception and transmission equipment which may be the result of a combination of the previously defined equipment but also, for example, intelligent instruments, reflex automata, sequential automata, control computers, maintenance assistance, specialized equipment required for the application.

Each exchange over the transmission line takes place by a succession:
  of a first frame which may for example comprise a preamble, a 16 bit word, . . . , a control block, for example of "CRC" type (cyclic code for detecting consistency errors of the data), . . . , this frame corresponding to the nomenclature of the data which will be made available on the line, and
  a second frame which may for example comprise a preamble, a value, a control block, for example of "CRC" type, this frame containing the value of the data corresponding to this nomenclature, this word in fact representing the contents of the data identified by its nomenclature.

It should be noted that the use of a cyclic code, particularly reliable for detecting consistency errors of the exchanged information (for example of "CRC" type), makes it possible to make good the absence of an acquittal procedure in the information exchanges.

Thus, the nomenclature/information pair may be:
  the result of an A/D conversion from a sensor;
  a control to an analog actuator;
  a combination of logic states from sensors;
  a combination of logic states to actuators;
  a variable internal to an automaton;
  the value of a parameter;
  any logic combination of 16 bits.

The information exchanges are timed by the Bus Arbitrator which broadcasts the nomenclatures cyclically over the line, and take place in accordance with the following procedure:
  the Bus Arbitrator broadcasts a nomenclature;
  the station which has this nomenclature recognizes itself;
  the station which has recognized itself makes the information associated with the nomenclature which has just been transmitted available on the line;
  the stations which wish to consume this information previously identified by its nomenclature then read the information transmitted by the producer station;
  the Bus Arbitrator also consumes the information so as to make sure that the transaction is carried out correctly and the cycle continues by sending a new nomenclature.

In the case of cyclic traffic, the functions of the Bus Arbitrator may then be summed up as follows:
  controlling the nomenclature to be transmitted as a function of the transmission frequency of this nomenclature;
  verification of the transmission of the data associated with this nomenclature;
  the timing of the frames;
  transmission of the new nomenclature;
  operating test of the transmission system (detection of errors, collisions, the correct operation of the connected equipment).

The functions of an information receiver may be summed up as follows:
  detection of the presence of a nomenclature on the line;
  reception of this nomenclature;

recognition of the utility of receiving information associated with this nomenclature or waiting for a new nomenclature;

reception of the data associated with the nomenclature;

storing of the data associated with the nomenclature which has just been read.

The functions of an information transmitter can also be summed up as follows:

detection of the presence of a nomenclature on the line;

reception of this nomenclature;

the recognition of the utility of transmitting the data associated with this nomenclature or waiting for a new nomenclature;

selection of the data to be transmitted, associated with the nomenclature which has just been read;

transmission of the data associated with the nomenclature.

The information transmitter-receivers group together all the functions of the previously enumerated information transmitters and receivers.

From the foregoing description it is clear that in accordance with this transmission system:

Each piece of equipment connected to the transmission line may have access to all the information flowing over this line. By construction, the signal multiplying effect makes it possible to make the information transmitted by a subscriber available to all the other subscribers. This feature virtually gives each subscriber the impression of being "connected" to all the information which flows.

Information from a sensor may then be acquired by all the other equipment connected to the line, as soon as this information is transmitted over the line, the wiring being limited to connection of the sensor to an acquisition card of a subscriber of the line.

The bridging of information between several pieces of processing equipment may take place over the line for the flowrates and the refreshment times are, in most cases, compatible with the real time aspect of the reflex automata.

The whole of the data exchanged over such a system (essentially cyclic exchanges of state variables) may be modelled by a distributed data base, each entity of which, connected to the transmission line, keeps a copy of the data concerning it, either as producer or as consumer.

In fact, this distributed data base, which groups together a collection of data grouped together by object, is an abstract representation of the information which is distributed over the transmission line, so that at all times all the users of an object must have the same perception of this object. Such perception is modelled by a frame which applies to each type of information which may be distributed over the transmission line. This model makes it possible to provide a biunique correspondence between an object of the data base and an entity addressable by a connection interface of an apparatus. Such correspondence is illustrated in tables I and II hereafter.

TABLE I

DISTRIBUTED DATA BASE

OBJECT

TABLE I-continued

Description
- L_Identification
- name : "A_name"
- Class : "Class"
- Periodic = (aperiodic)
- data type : (description of type)

State
- Validation : "Valid"
- Coded value

TABLE II

LOCAL ENTITY

Object data / Image data

L_Identification
name : "A_name"
Class
Period
Data type
} Description {
- Image description
- Use

LOCAL CONFIGURATION OF THE OBJECT

Configuration-identification
Key attribute
Description of the data
L_Identification
Name
Class
Period
Data type
Description of the data
Use

CONFIGURATION OF THE ENTITY

Class (controlled automatic start).
"List Of" (references relative to the configuration of the data of an object for each object produced by the entity).

"List Of≠" (references relative to the configuration of an object for each object known and not produced by the entity).

As can be seen from table I, the frame of the objects of the data base comprises a list of attributes for identifying the objects and supporting specific variables of this object. This list may more particularly comprise:

An identification attribute L_I formed by an integer of 16 bits, which serves for identifying the object in the transmission line. It represents the identification used internally in the line and in the data base.

A name attribute "A_name": this attribute, of character chain type, serves for identifying the objects between cooperating entities. such identification may also be used.

A class attribute "Class": this attribute indicates the class of the object including a variable and a description.

A period attribute: this attribute contains an aperiodic value if the object is not to be updated periodically, or the value of the required refreshment period.

A data type attribute "Data_type": this attribute must contain the name of the data type. It defines both the semantics and the coding rules of the coded value attribute.

A valid attribute "Valid" which will contain a value signalling a fault if the object is not at the moment available for a consumer for any reason, for example because of an absence of provider, or a modification during its definition. It should however be noted that an object may be valid in the data base whereas it is invalid for a consumer, for example because of a defect of the consumer.

A coded value attribute: this attribute must contain either the current value of the object, coded according to the rules defined by the "Data type" attribute or the "Indefinite" value. The current value is updated periodically or at random, depending on what is defined in the period attribute. This attribute contains the last value sent over the line following a message ID_DAT LPDU.

The information which has to be stored in each local entity and which can be used by the distributed data base is modelled locally, at the level of the connecting layer, in a given object configuration "local configuration of the object" including the following attributes (Table II):

- a configuration and identification attribute which identifies the local configuration of the data of the entity,
- a data description attribute which contains the static attributes of the frame of the objects of the data base, namely:
  the identification attribute,
  the name attribute "A_name",
  the class attribute "Class",
  the period attribute "Period",
  the data type attribute "Data_type",
- an "image description" attribute which contains the static attributes of the image data,
- a utilization attribute (provider and/or consumer or neither of these two modes).

The characteristic parameters of each entity are modelled in an object configuration "entity configuration" which allow it to communicate with another entity, such modelling comprising the following attributes:

- a class attribute = automatic start, controlled start,
- a "List of" attribute which must contain the list of the references relative to the configuration of the data of an object, for each object produced by the entity,
- a "List of" attribute which must contain the list of the references relative to the configuration of an object for each object known and not produced by the entity.

To each "controlled start" value included in the configuration of an entity, there corresponds a control register organized as a control object "control" consumed by the entity, this object comprising the following attributes:

Key attribute (field data reference) which contains a local reference to an object consumed by the entity, and Start attribute "Start" which serves for validating the introduction protocol which will be defined hereafter in the description; this attribute is sent to the network in a way similar to that of the previously mentioned coded value attribute.

It is then apparent that each object has a specific class. The only classes differentiated in the mechanism proposed are: the VARIABLE and the DESCRIPTION.

Updating and maintenance of the data base are provided by a connectionless protocol. Each local entity maintains a local copy of a corresponding useful part of the data base and, when required, updates the part of the data base which it contains.

The main services rendered by the transmission line to the different user entities are control of the updating of the data base, access to the local image of this data base and updating of the objects.

The data base is independent of the physical position of the data providers and consumers.

The relation between an apparatus and its data produced and consumed may be modified without generating transformation of the data base.

In addition to a partial copy of the data base, each entity maintains a data image for each object produced which it consumes. This image, which contains the information for the transfer of an object to a device, is modelled in a configuration comprising the following attributes:

- a "Key", attribute which must contain a reference to an object used by the device,
- a "Use" attribute which must contain either the "consumer" value if the coded value of the object is to be received by the entity or "Provider" if it is to be transmitted, a value Both indicating that the coded value is to be received and transmitted, and a value indicating that the coded value is not to be transmitted or received,
- a "Valid" attribute which must contain the value "False" if the object is not locally available and "True" in the opposite case; the reasons for the invalidation comprise in particular the global invalidation of the object (validity attribute=False), or non conformity between the description of the object given by the transmitting entity and the description of the object desired by the local entity, and local failures,
- a "Next value provided" attribute: if the "Use" attribute of the image is "Provider" or "Both", this attribute will contain either the next value to be sent or the "indefinite" value; this value is updated by the local user and may be different from the coded value of the object; the value of this attribute must be transmitted to the line following an instruction ID_DAT LPDU by thus updating the coded value attribute of the object.

Access to the data base is provided by the Bus Arbitrator which forms a single entity guaranteeing that updating of the data base takes place in accordance with the period and precision requirement specified by the user entities.

The difficulty, in such a system, is to guarantee that the producer and consumer of the same data are agreed about the rules of use of the variable, about its syntax and its semantics, whatever the events disturbing the network (power cut of a station, modification of the configuration of a station, insertion of a new station): in no case must a variable transmitted as a chain of bits be interpreted by the receiver as a floating number or anything else different from a bit chain.

The solutions usually used for guaranteeing the consistency between transmitter and receiver consist:

in sending at the same time into the network, for each exchange, the value of the variable and its syntactic or semantic description; this has the drawback of loading the network and losing the passband, which is very often unacceptable;

in negotiating, before any exchange of variables, the context of communication between the communicating entities, by establishing a logic connection between transmitter and receiver; this has the drawback of requiring a complex connection mechanism and it must be established for any transmitter-receiver association (several possible connections per product); it proves that the cost of the connection protocols and the simultaneous maintenance of several connections is prohibitive for simple products connected to the transmission line, which is contrary to the desired aim.

The invention has more particularly as object to solve the problem of consistency guarantee, using a protocol without previous contact, or acquittal, designed so as to economize the passband of the transmission line.

For this, use was first made of a central entity knowing the configuration of the network (connected products and exchanged variables and capable of verifying the configurations of the connected products before bringing them into service on the network and, possibly, of remotely loading this configuration. This entity may be the master controller if it exists, or a dedicated independent entity, which must remain permanently on the network.

However, this solution has multiple drawbacks:
it requires an entity controlling all the configurations of the network. Now, even if, at a certain moment of the design stage, an overall view of the network is necessary, the configuration information may then be divided between different entities (several controllers on the network, several constructors), and it may be penalizing to then group together this information in a single entity.

Even if the central entity exists in the design phase, it is penalizing to require a permanent connection of this entity for managing the events disturbing the network (power cut, replacement of defective product, . . .).

This is why the invention proposes carrying out such consistency checking before any use, even in the case where there has previously been a design office check at generation, such a check in particular allowing communication between the globally configured entities and, possibly, other locally configured entities (addition of new entities in a globally configured network).

Of course, such consistency checking will have to take place using the non optional services of the layer connecting the entities, namely using the information exchange mechanism by broadcasting without acquittal.

When an entity is brought into service, this check will take place between a producer entity and consumer entities, via the line.

It should however be noted that this check does not guarantee that all the entities concerned by an object have the same specification of this object its only purpose is to guarantee that only the entities having the same specification of this object will participate in the exchange of the object.

Considering the foregoing, the invention proposes generally a method for transmitting information by means of a line capable of effecting a series-multiplexed type transmission between entities capable of transmitting and/or receiving information from and to the line, and to provide physical interfaces between application interfaces and the line, so that each entity connected to the line may have access to all the information flowing over the line, the whole of the data exchanged being modelled by a distributed data base, the updating and maintenance of which are ensured because each entity keeps and updates a local copy of the corresponding useful part of the data base which it contains.

According to the invention, this method is more particularly characterized in that, whenever an entity is brought into service, it comprises a consistency check for guaranteeing that the producer and consumer entities interpret a piece of information in the same way, this consistency check comprising the generation of validation information by each of the entities, this information signifying an invalid state at the moment the method is implemented and only signifying a valid state if this entity recognizes a specification of an object of the data base transmitted over the line and in that only the entities generating validation information signifying a valid state may participate in the exchange of the value of the object.

Taking into account the fact that the validation and invalidation phases use a non acquitted exchange service, it is thus possible to avoid having to use an acquittal system which is usually expensive.

Advantageously, the entities generating validation information in the valid state for the same object will present the same specification, this common specification being frozen and able to be exchanged at any time to allow new entities to participate in the exchange.

Moreover, the specification transmitted over the line within the framework of this consistency check will be provided by the entity comprising the global specification of the object, this specification being then delivered in the form of aperiodic or possibly periodic data.

It is clear that as soon as the local description of an entity is modified or likely to be modified (reset, power resumption, local modification, . . .), this entity withdraws from the exchange.

In the case where this entity is a consumer, it may withdraw without disturbing the other participating entities (only its validation information is in the invalid state).

A producer entity which transmits a validation signal in the invalid state must suspend updating, not only of its buffer memory serving for transmission (transmission buffer), but also buffer memories serving for reception (reception buffer) of the receiving entities. For that, it invalidates its transmission buffer at the level of the connection layer, which invalidates updating of the value in the network. Such invalidation is detected by the receiving entities. Following such detection (which is guaranteed for any receiver), any receiving entity invalidates the object locally.

To invalidate an object, a consumer entity has two pieces of information:
the detection of an invalidation message of the network (invalidation RP_DAT) which is incorrect or absent after reception of a message ID_DAT identifying the frame of the object, the message RP_DAT of the network having to contain the parameters of the object, it being understood that invalidation of a producer entity not followed by a transmission error generates an invalidation RP_DAT message (producer entity in service, data invalid) or an RP_DAT absent (no frame) (producing entity out of service).
optionally, a signal (time out) monitoring refreshment of the network (promptitude) which also takes into account the absence of refreshment due to transmission errors. Such transmission errors then cause either a RP_DAT absent or a RP_DAT incorrect, or the absence of sequence ID_DAT/-RP_DAT.

The consumer entity obligatorily invalidates an object following reception of an invalidation RP_DAT.

The producer entity imposes the global invalidation by generating several invalidation RP_DAT messages (at least 3) so as to be sure that each consumer entity will detect at least one invalidation RP_DAT.

Modification of the specification of an object while guaranteeing the consistency takes place in two steps:
- a first step consisting in invalidating the object in the whole of the entities concerned, beginning by the producer,
- a second step which takes place when it is certain that the entities concerned have invalidated the object, this step consisting in introducing the object with a new description.

The broadcasting of a specification over the network must be made by one entity and only one. The simplest thing is then for this specification to be broadcast by the entity producing the object.

There may however exist simple products (TOR input modules) for which the storage and control of this information are of prohibitive complexity. It is possible to store the specification elsewhere (for example in the automaton) provided that the invalidation rules are strictly respected. The available stored specification must at all times conform to the value transmitted by the producer and a possible modification of the specification must follow invalidation by the producer.

At the time of an automatic or controlled start, the introduction algorithm may be initiated by each entity following a local event such, for example, as power resumption, after cut off or re-setting. This introduction may take place either automatically "automatic start mode" or after the authorization of a third party "controlled start mode".

The operating mode is defined by the "start" class attribute of the object and the authorization is given by the writing of a control word represented by the control attribute of the device and transmitted by the "command" identifier.

The "controlled start" mode makes it possible for an application programme, specialized in the configuration control to read or remotely load the configuration of the data, the data and the image of the data for each entity, to make an overall check and, only afterwards, to cause starting of the entity. It provides additional safety by controlling the identifier duplications of the data before collision in the network.

The specification broadcast over the network contains (among other things) the network period of the data, which must be consistent with the network period guaranteed by the Bus Arbitrator in its scanning table.

It is possible to use an optional application programme, related to the Bus Arbitrator, to check such consistency and take a decision in the case of an anomaly: either to withdraw the data from the scanning table, or to modify the scanning table accordingly.

As mentioned above, the invention provides a protocol to be executed by any data producing or consuming entity with a view to its being brought into service on the network, while guaranteeing the consistency of the description between transmitting entities and consuming entities.

Embodiments of this protocol will be described hereafter by way of non limitative examples, with reference to the accompanying drawings in which:

BRIEF DESCRIPTION OF THE DRAWINGS

FIG. 2 is a flowchart of an introduction protocol which is to be executed for each data produced when the description is not stored in the producer entity (in the case where the producer entity is not rich enough to contain its description);

FIG. 3 is a flowchart of an introduction protocol to be executed for each data consumed.

Figure 1:
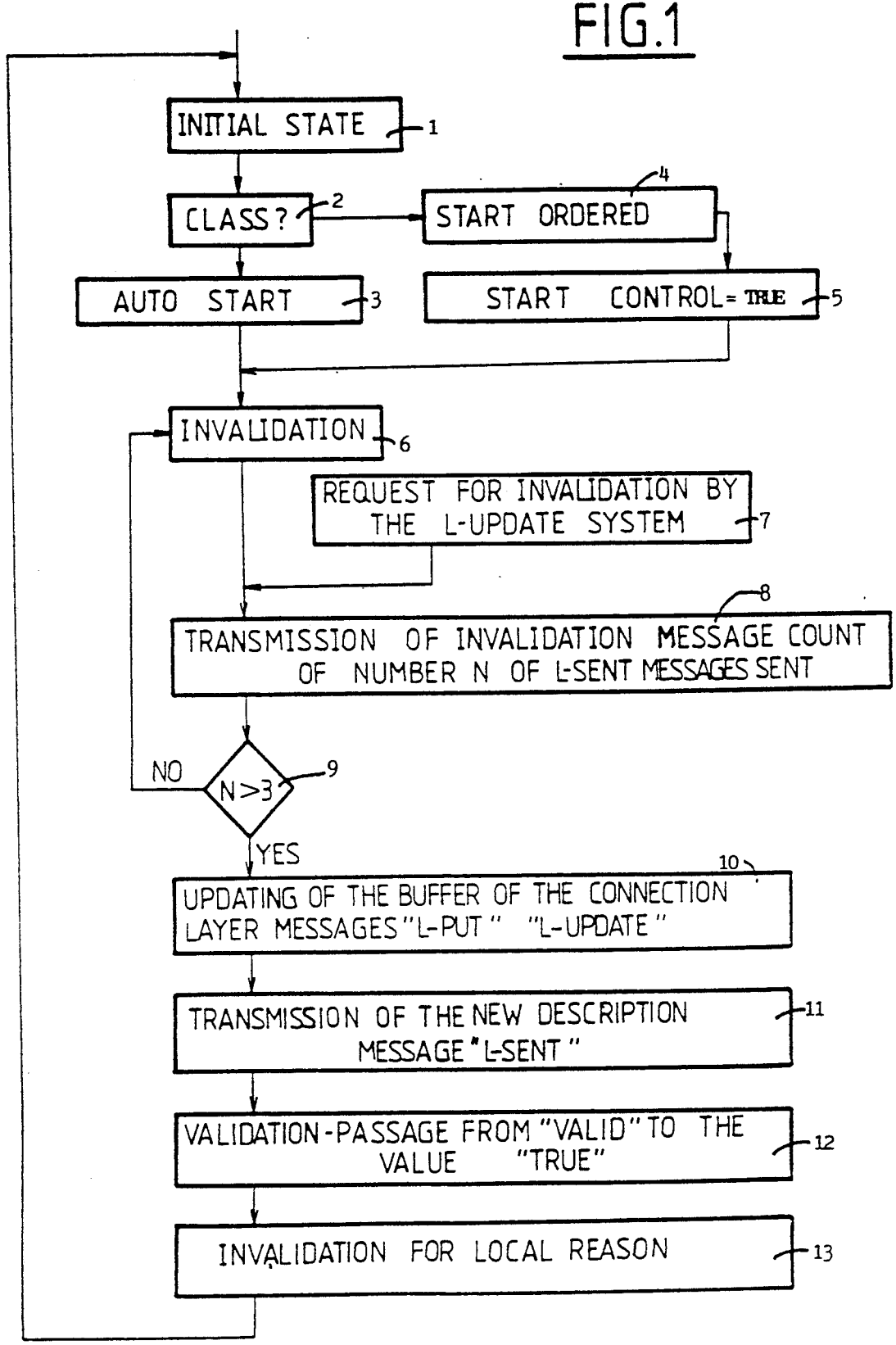
FIG. 1 is a flowchart of an introduction protocol to be executed for each data produced when the description is stored in the producer entity.

It should first of all be noted that each data produced by the producer entity implies the execution of an algorithm. Furthermore, the entity must manage an identifier produced for the value of each data and another identifier for the specification of this data.

The producer entity must further be capable of generating aperiodic updating requests (instruction L_UPDATE=request instruction to the connection layer to effect aperiodic updating).

In the case where the producer entity possesses the specification of the variable, the start phase of the algorithm takes place at the time of a local situation (start, reset, power resumption, configuration) such that the entity cannot guarantee the consistency of its state with that of its correspondents, in this case:
- the attribute "Valid" of the image data bears the mark "False",
- the transmission buffer in the connection layer of the entity containing the value of the data is invalid (writing instruction in buffer L_PUT, empty),
- which causes transmission over the network of an invalidation RP_DAT message in response to a message ID_DAT (frame transmitted by the Bus Arbitrator which provides means for access to the entity possessing the associated data).

At the same time, the transmission buffer of the connection layer assigned to the entity, which contains the specification of the data, is also invalid so as to avoid the simultaneous running of the introduction protocol by a consumer.

If the class of the entity ("Start" class attribute of the entity) is "automatic start" or if this class is "ordered start" and if the control word ("Entity control" attribute of the entity) allows starting, the algorithm executes a following phase of the algorithm consisting in guaranteeing the invalidation (transmission of a "flag" invalidation signal) in all the receiver entities. One possible method is to transmit several (recommended value: 3) messages RP_DAT having an empty content. Several algorithms can be used by the producer entity: the only requirement is that these algorithms generate at least several invalidation messages RP_DAT in a given time.

FIG. 1 shows one example of such an algorithm to be executed for each data produced when the description is contained in the producer entity.

In this example, in the "initial state" block 1, the image of the data is invalid.

The next step is then reading the class attribute "Class" (block 2). In the case where this attribute contains the automatic start information "Auto-start" (block 3), the system passes automatically to the next step. On the other hand, if this information is "start ordered" (block 4), the system will only pass to the next step after the transmission of a control instruction ("Start control=True") (block 5).

The next step must comprise the transmission of a given number (recommended value: 3) of consecutive invalidation messages RP_DAT (block 6). These messages may be sent by the system in response to the cyclic scanning of the variable by the Bus Arbitrator or may be caused by an explicit request of the system (in the case where the variable is not scanned periodically, or periodically with a long period), by the instruction "L_UPDATE" (block 7). Transmission of the invalidation message is signalled by the indication L_SENT. The system counts the indications L_SENT (block 8) and remains in the invalidation phase as long as their number is less than the predetermined value (block 9).

The next step consists in updating the buffer of the connection layer by introducing a description of the new variable (block 10). This is then executed after the transmission of the instructions L_PUT (acquisition of the description of the variable) and L_UPDATE (updating of the description of the variable).

Following transmission of the new description signalled by the indication L_SENT (block 11), the system proceeds to update and validate (passage from the attribute "Valid" of the data image to the value "True") the image of the new data (block 12).

In the case where, for a local reason, the variable is invalidated (local invalidation) (block 13), the system reinitiates the algorithm from the beginning (i.e. from the initial state = image of the invalid data). This procedure is begun for each local event casting a doubt on the consistency of the local specification with respect to the network.

In the case where the producer entity does not possess the specification of the variable, an algorithm must be executed for each data produced by this entity, which must then manage an object identifier for this value and a consumed identifier for the specification of this value.

In this case, the producer entity does not have to manage a periodic updating requests(instruction L_UPDATE) for this function.

An entity of the network manages the specification of the data and must then provide an object identifier for the specification.

In a way similar to the preceding one, the algorithm starts, following local situations (start, reset, power resumption, configuration, . . .) such that the entity cannot guarantee the consistency of its state with that of its correspondents in the network, the attribute "Valid" of the data image indicates the information "False".

The transmission buffer in the connection layer of the entity containing the value of the data is invalidated (instruction for writing in buffer L_PUT, empty), which causes the transmission over the network of an invalidation message RP_DAT in response to a message ID_DAT transmitted by the Bus Arbitrator.

This invalidation is monitored by the entity which manages the specification of the data, which accordingly invalidates the transmission buffer containing the specification of the data (in order to avoid the simultaneous running of the introduction protocol of the new data by a consumer).

The way in which the entity managing the specification is informed of the invalidation of the producer depends on a local application programme which ensures the detection of an invalidation signal RP_DAT, which monitors the state of the station, etc. . .

If the class of the station ("Start" class attribute) of the entity is "automatic start", or if this class is "controlled start" and if the control word ("entity control" attribute) allows starting, the entity executes the next phase of the algorithm.

This phase consists then in guaranteeing the invalidation by the invalidation signal in all the receivers, by transmitting at least the predefined number of invalidation signals RP_DAT, after invalidation of the value and of the specification.

Several algorithms are possible between the producer and the entity managing the specification: the only requirement is that these algorithms generate at least the pre-defined number of invalidation signals RP_DAT in a given time.

One example of such an algorithm is illustrated in FIG. 2.

As in the preceding example, this algorithm starts from an "initial state" block (block 15) in which the data image is invalid, then a second step including reading of the class attribute (block 16).

In the case where this attribute is "automatic start" (block 17), the system will pass to the next phase. On the other hand, if this attribute is "start ordered" (block 18), the system will only pass to the next step following the transmission of a control instruction ("start control=-True") (block 19).

This step then comprises the invalidation by the producer entity of its transmission buffer (block 20). The entity managing the specification, after invalidation of this specification, generates at least the pre-defined number of aperiodic requests on the value, which will generate an invalidation RP_DAT (instruction L_SENT: invalidation data signal) (block 21).

The phase which follows this invalidation step is a step for updating the transmission buffer containing the specification of the data with the new description by an instruction L_PUT, which description is in the entity managing the specification. A request for aperiodic updating of this identifier is managed by the instruction L_UPDATE, a description in this entity which causes broadcasting of the specification over the network.

The algorithm makes sure that this specification has been received by the producer entity (block 22, block 23), if not it passes to the invalidation phase (block 20).

On reception of the specification broadcast through the network, the producer processes the specification according to a local algorithm comparable to that used by a receiver entity.

Depending on the result of the processing, it validates (or not) (block 25) the value identifier of the data by updating the transmission buffer (block 24) by an instruction "L_PUT value" and marks the validation attribute of the image data with the value "True".

As mentioned above, for each data consumed, the consumer entity must implement an introduction algorithm.

For this, the entity must manage an identifier produced for the value and an identifier consumed for the specification of each data.

The consumer entity may or may not be capable of managing aperiodic updating requests (following transmission of an instruction L_UPDATE).

Such as shown in FIG. 3, the introduction algorithm starts from an initial state (block 30) in which the validation attribute of the image of the data is in the invalid or false state.

This occurs in the case of local situations such as start, reset, power resumption, configuration, . . . such that the entity cannot guarantee the consistency of its state with that of its correspondents. Updating in the reception buffer is invalidated.

If the class "Class" (block 31) of the entity (starting class attribute of the entity) is "Auto-start" (block 35) and if the control word ("Command Start" attribute of the entity) allows starting, the system executes the next phase of the algorithm.

This phase consists in waiting for the broadcasting of the specification (block 35) (request instruction for broadcasting of the specification=L_UPDATE) (block 36) and at the time of reception "Receive" of this specification (block 37) processing this specification in accordance with an algorithm of its own and comparing (block 38) it with its own configuration information. If it accepts (block 39) the specification received from the network, it validates (block 40) the reception of the value of the data (block 42) and marks the attribute of the image of the data with the value "True", if not it remains in the same state.

The algorithm for processing the specification depends on the implementation and may for example result from the following three cases:

The entity possesses a complete local specification. It compares the specification provided by the network with its own local specification and validates the data (block 40) if these two specifications are identical and leaves it invalid (block 41) if these specifications are different.

The entity possesses a partial specification. In this case, it compares this specification with the corresponding parts of the specification received from the network and completes the missing parts from the specification delivered by the network. In this case, configuration processing of the entity may be made necessary.

The entity does not possess a specification. In this case, it accepts the specification transmitted by the network and configures itself accordingly.

It should be noted in this connection that it is not necessary for the entity to store the specification transmitted by the network. It is sufficient for it only to guarantee processing in conformity with this specification.

Furthermore, the specification request on the initiative of a consumer entity is particularly useful in the case of bringing this consumer entity into service in an operating network. If this entity is not capable of generating aperiodic requests, it will then be necessary to use an application programme monitoring use of the station for generating the request for broadcasting the specification.

An abnormal response (silence or invalidation data) to a specification means that the producer entity is invalid. The consumer entity then places itself in a stand-by condition waiting for the producer to be brought into service.

A consumer entity will invalidate data causing passage from the attribute of the value "Valid" to the value "False" on reception of an invalidation message RP_DAT or possibly following the detection of several consecutive errors on reception.

What is claimed is:

1. Method for transmitting information between a plurality of producer and receiver entities of a control and checking system of an industrial equipment, comprising sensors as producing entities, actuators as receiving entities and programmable controllers as producing/receiving entities, said information being transmitted by means of a series-multiplexed type transmission line on which said entities may be connected to form a network and brought into service so as to transmit information on said line and to have access to all the information flowing on said line, said information being modelled by a distributed data base including a collection of data grouped together so as to form a plurality of objects, each having a specification and a value, each entity comprising a memory storing a copy of the specification and the value of at least one object which concerns it, wherein, for each new entity brought into service on the line and which processes and consumes one of said objects, said method comprises the following steps:
   a step of transmitting on the line the specification of said object,
   a step of receiving said transmitted specification by every entity concerned by said object,
   a step of comparing in each of said entities the received specification with the specifications included in the memory of said entity,
   a step of generating an invalidation information of the object in one of said entities when the comparison effected in this entity reveals a difference,
   a step of generating a validation information of the object in one of said entities when the comparison effected in this entity reveals an identity, only the entity which has generated a validation information being habilited to participate in an exchange of the value of the object.

2. Method according to claim 1, wherein the entities generating validation information for the same object have a common specification which corresponds to said transmitted specification and which is able to be exchanged at any time so as to allow new entities t participate in the exchange.

3. Method according to claim 1, wherein,
   when transmitting an invalidation information, one producer entity suspends the updating not only of its own memory, but also of the memory of said receiver entities.

4. Method according to claim 1, wherein the invalidation of an object, by a receiver entity takes place by the reception, by said receiver entity, an invalidation information which comes from another entity.

5. Method according to claim 1, wherein in order to invalidate an object, a receiver entity generates a signal monitoring a refreshment of the network.

6. Method according to claim 1, which further comprises sequence modifying an object, while guaranteeing the consistency, said sequence comprising the following two steps:
   a first step of invalidating the object in all the entities concerned, beginning by the producer;
   a second step which takes place when the entities concerned have invalidated the object, this step consisting in introducing the object with a new specification.

7. Method according to claim 6, characterized in that broadcasting over the transmission line of the new specification is effected by one entity and only one.

* * * * *